Aug. 23, 1960
T. J. SMITH ET AL
2,950,424
SOLENOID AND ROTATABLE SHAFT DEVICE
Filed July 3, 1957
2 Sheets-Sheet 1
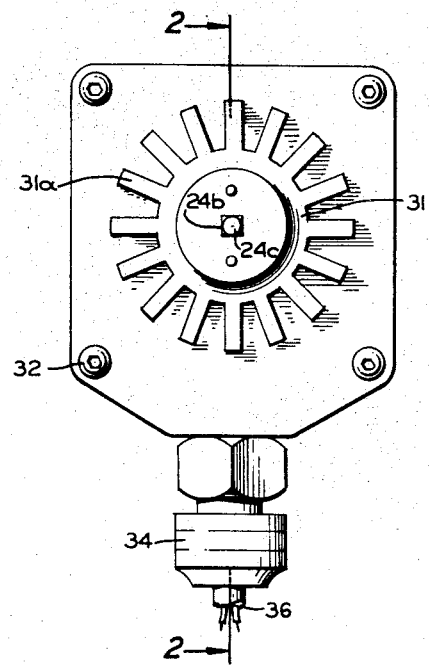
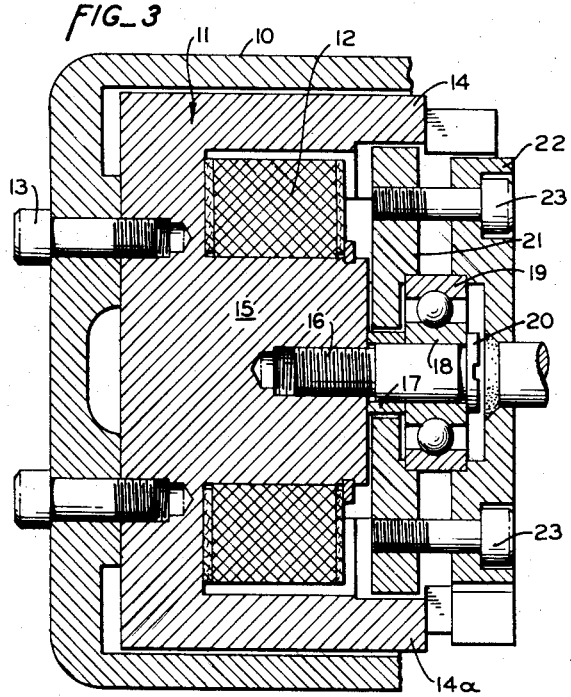
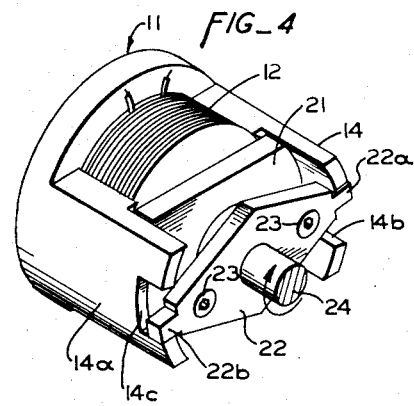
INVENTORS
TRAVER J. SMITH
RALPH K. DAUGHERTY
BY *Allen and Chesay*
ATTORNEYS Aug. 23, 1960　　　　T. J. SMITH ET AL　　　　2,950,424
SOLENOID AND ROTATABLE SHAFT DEVICE
Filed July 3, 1957　　　　　　　　　　　　　　　2 Sheets-Sheet 2
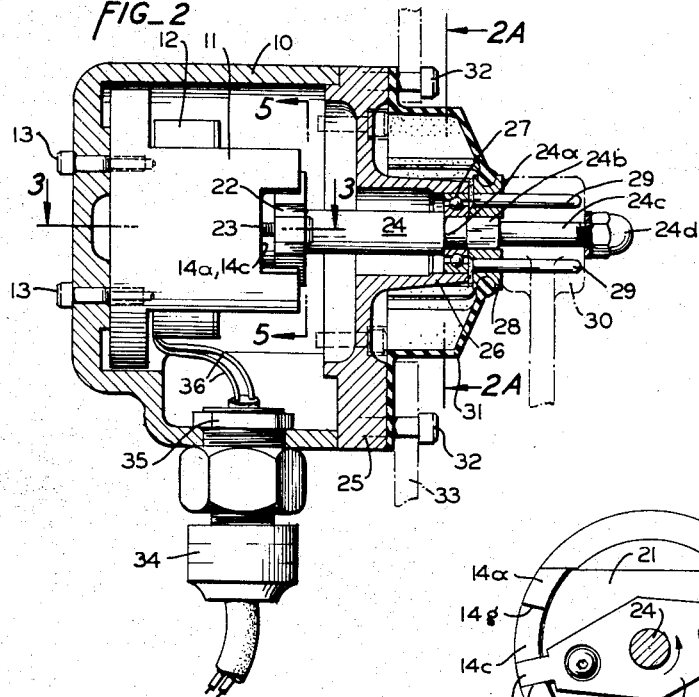
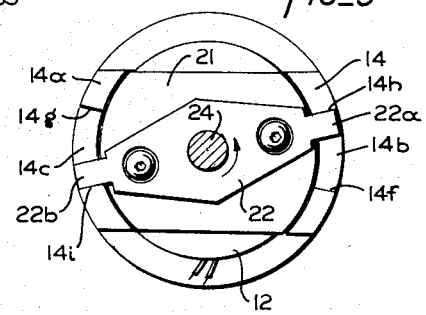
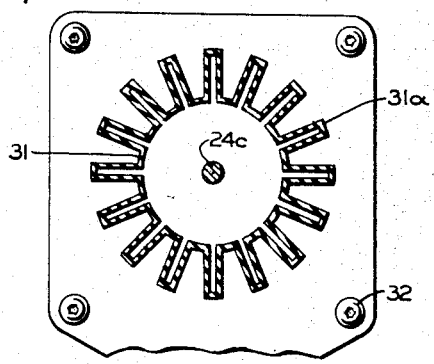
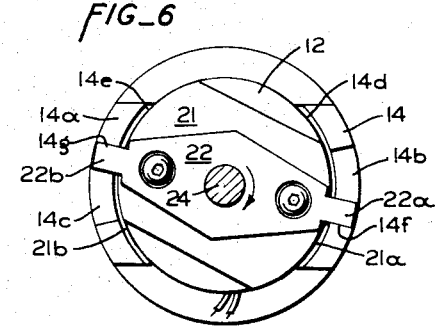
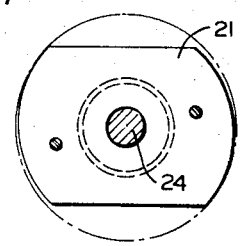
INVENTORS
TRAVER J. SMITH
RALPH K. DAUGHERTY
BY *Allen and Chromy*
their ATTORNEYS

United States Patent Office 2,950,424
Patented Aug. 23, 1960

2,950,424

SOLENOID AND ROTATABLE SHAFT DEVICE

Traver J. Smith and Ralph K. Daugherty, San Jose, Calif., assignors of one-half to Genevieve I. Magnuson and one-half to Genevieve I. Magnuson, Robert Magnuson, and Lois J. Fox, as trustees Filed July 3, 1957, Ser. No. 669,794

7 Claims. (Cl. 317—197)

This invention relates to solenoid and rotatable shaft devices in general. More particularly this invention relates to a solenoid and rotatable shaft device of improved construction such that it is adapted for a variety of different applications and will withstand long periods of use without requiring attention and servicing.

An object of this invention is to provide an improved electrically energized solenoid for rotating a shaft through a predetermined angle.

Another object of this invention is to provide an improved electrically energized device for rotating a shaft, said device being equipped with a housing and seal to prevent undesired liquids or vapors from contacting interior parts thereof.

Still another object of this invention is to provide an improved solenoid operated rotary device that is provided with an armature spaced from the pole pieces of the solenoid by an air gap that is gradually decreased as the armature is rotated, said armature being attached to a shaft which is provided with a rotary motion limiting stop made of non-magnetic material and cooperating with the solenoid pole pieces to limit rotation of the armature.

Other and further objects of this invention will be apparent to those skilled in the art to which it relates from the following specification and claims.

In accordance with this invention there is provided an improved solenoid structure for actuating rotatable shafts and the like. This device is provided with a housing and gasket structure that is adapted for sealing the device against various moisture conditions, said gasket being made of yieldable material shaped so that it may be readily attached to the housing of the device as well as to the rotatable shaft.

Another feature of this invention is the construction of the pole pieces and armature of the solenoid which are arranged to give a substantial torque to the shaft that is adapted to be actuated by the armature through limited angles. The armature is carried by a suitable bearing that is supported on the central core member associated with the solenoid. An additional bearing supported in a tubular extension attached to the housing is provided to the shaft so that the shaft is mounted on two spaced bearings whereby it may be employed for actuating devices requiring substantial torque.

Further features of this invention will be apparent to those skilled in the art to which it relates from the following specification, claims and drawing in which briefly:

Fig. 1 is a front view of an embodiment of this invention;

Fig. 2 is a sectional view taken along the line 2—2 of Fig. 1;

Fig. 2a is a sectional view taken along the line 2a—2a of Fig. 2;

Fig. 3 is a sectional view taken along the line 3—3 of Fig. 2;

Fig. 4 is a perspective view showing details of construction of the solenoid and armature;

Fig. 5 is a view showing the armature and stop device associated therewith in one position;

Fig. 6 is a view showing the armature and stop device associated therewith in another position; and Fig. 7 is a view showing the configuration of the armature.

Referring to the drawing in detail, there is illustrated a practical embodiment of this invention employing a casing 10 made preferably of non-magnetic material and having positioned therein a magnetic core 11 and winding 12 which surrounds the central core member 15. Outer core members 14 and 14a are positioned on the outside of the circumference of the coil 12 and partially enclose this coil. The pole pieces of the outer core members 14 and 14a extend beyond the coil 12 and are provided with recesses 14b and 14c, the purpose of which will be described hereinafter.

The outer core members 14 and 14a are also provided with recesses 14d and 14e, respectively, on inner surfaces thereof which cooperate with the armature 21 to provide air gaps between these core members and the ends of the armature 21 which air gaps vary in length depending upon the position of the armature with respect to the core members.

The central core member 15 supports a stud 16 which is provided with threads that engage corresponding threads provided to this central core member. The head 20 of the stud 16 engages the inner race 18 of the ball bearing assembly and presses this inner race against the collar 17 which is positioned between this inner race and the central core member 15 as shown in Fig. 3. The outer race 19 of the ball bearing assembly is clamped between the armature 21 and the member 22. Suitable recesses are provided in the armature 21 and in the member 22 for receiving the outer race 19 of the ball bearing assembly. Machine screws 23 are provided for the purpose of supporting the member 22 on the armature 21 and also for the purpose of clamping the outer bearing race 19 between the armature 21 and the member 22.

The member 22 is provided with extensions 22a and 22b which are adapted to cooperate with the recesses 14b and 14c of the outer core members 14 and 14a, respectively. These extensions 22a and 22b serve to limit the rotary motion of the member 22 and the armature 21.

A shaft 24 is attached to the member 22 and this shaft extends out of the tubular member 26 that is provided to the cover 25 of the housing 10. A portion 24a of reduced diameter is provided to the shaft 24 and this portion engages the inner race of the ball bearing assembly 27, the outer race of which is positioned in the end portion of the tubular extension 26. A section 24b having a square cross section is provided to the shaft 24 adjacent to the portion 24a and this square section fits into the disc member 28 having a hole of similar configuration. Key pins 29 are supported by the disc member 28 and these pins are lodged in suitable holes formed in the hub of the lever 30 which is held on the portion 24c of the shaft by means of a suitable nut 24b and which is adapted to be rotated by the shaft.

A cover 31 of resilient material is provided for the purpose of excluding moisture laden atmosphere from the bearing assembly 27 and associated working parts. This cover encircles the disc member 28 and is attached thereto by suitable cements or otherwise and it is also provided with a flange that is adapted to be clamped between the cover 25 and the panel 33 by means of suitable machine screws 32.

The body portion of the cover 31 is provided with radially extending ribs 31a as shown in Fig. 1, which ribs are hollow as shown in Fig. 2a so that the cover is readily susceptible of slight rotation, that may be imparted to the disc 28, with respect to the cover 25. With this cover configuration wear therein is minimized so that this unit may be placed through innumerable operations.

The ends of the armature 21 are of arcuate configuration as shown in Figs. 5, 6 and 7. These ends are sections of a circle, the arc of each end having a different center and furthermore, these arcs are not concentric with the center of the shaft 24 as shown in Fig. 7. Likewise, the recesses 14d and 14e provided to the ends of the outer core members 14 and 14a, respectively, are of arcuate cross section, and each has a different center displaced from the center of the shaft 24. As a result, when the armature is in the position shown in Fig. 6, in which the extensions 22a and 22b abut, the stops 14f and 14g, respectively, air gaps 21a and 21b exist between the ends of the armature 21 and the recesses 14d and 14e of the outer core members 14 and 14a. When the armature is in the position shown in Fig. 5, in which position the ends 22a and 22b of the member 22 abut the stops 14h and 14i, the lengths of the air gaps between the ends of the armature 21 and the outer core members 14 and 14a are reduced to a small fraction of the air gaps 21a and 21b.

The shaft 24 may be spring biased to hold it normally in the position shown in Fig. 6 wherein the ends of the member 22 abut the stops 14f and 14g. In this position substantial air gaps 21a and 21b exist between the armature 21 and the outer core members. Consequently, when the coil 12 is energized by a suitable electric current that is supplied to this coil through the connections 36 which enter the housing 10 through the fitting 34 that is held thereto by the nut 35 as shown in Fig. 2, the magnetic field set-up by the coil 12 causes the armature 21 to rotate into the position shown in Fig. 5 wherein the air gap is substantially reduced.

While I have shown a preferred embodiment of the invention it will be understood that the invention is capable of variation and modification from the form shown so that its scope should be limited only by the scope of the claims appended hereto.

What we claim is:

1. An electrically energized device comprising a coil adapted to be connected to a source of current supply for producing a magnetic field, a magnetic core for said coil, said core having a central member adapted to be lodged in said coil, said core also having outer members adapted to partially enclose the circumference of said coil, the free ends of said members forming magnetic poles of like magnetic polarity, an armature, a stud attached to said central core member, means for rotatably supporting said armature on said stud so that the ends of said armature are rotatable adjacent to said magnetic poles, each of the ends of said armature being of arcuate shape, each of said arcuate shapes forming a section of a circle the center of which is slightly displaced from the center of said stud, the surfaces of said poles of said magnetic core cooperating with the respective ends of said armature also each being of arcuate shape and each of said latter arcuate shapes forming a section of a circle the center of which is displaced from the center of said stud whereby the lengths of each of the air gaps between the ends of said armature and the faces of said poles are uniform throughout the cross sectional areas thereof and these air gap lengths are uniformly reduced as said armature is drawn into alignment with said outer members so that the arcuate ends of said armature and the arcuate surfaces of said magnetic poles are concentric.

2. An electrically energized device comprising a coil adapted to be connected to a source of current supply for producing a magnetic field, a magnetic core for said coil, said core having a central member adapted to be lodged in said coil, said core also having substantially diametrically opposed outer members adapted to partially enclose the circumference of said coil and forming magnetic poles of like polarity, the free ends of said outer members extending beyond said coil and having recesses formed therein, an armature, a stud attached to said central core member, means for rotatably supporting said armature on said stud so that the ends of said armature are rotatable adjacent to said magnetic poles, each of the ends of said armature being of arcuate shape, each of said arcuate shapes forming a section of a circle the center of which is slightly displaced from the center of said stud, the surfaces of said poles of said magnetic core cooperating with the respective ends of said armature also each being of arcuate shape and each of said latter arcuate shapes forming a section of a circle the center of which is displaced from the center of said stud whereby the lengths of each of the air gaps between the ends of said armature and the faces of said poles are uniform throughout the cross sectional areas thereof and these air gap lengths are uniformly reduced as said armature is drawn into alignment with said outer members so that the arcuate ends of said armature and the arcuate surfaces of said magnetic poles are concentric, and means attached to said armature cooperating with the recesses in said outer core members for limiting the rotation of said armature.

3. An electrically energized device comprising a coil adapted to be connected to a source of current supply for producing a magnetic field, a magnetic core for said coil, a housing for enclosing said coil and said core, said core having a central member adapted to be lodged in said coil, said core also having substantially diametrically opposed outer members adapted to partially enclose the circumference of said coil and forming magnetic poles of like polarity, the free ends of said members having recesses formed therein, an armature, a stud attached to said central core member, means for rotatably supporting said armature on said stud so that the ends of said armature are rotatable adjacent to said magnetic poles, each of the ends of said armature being of arcuate shape, each of said arcuate shapes forming a section of a circle the center of which is slightly displaced from the center of said stud, the surfaces of said poles of said magnetic core cooperating with the respective ends of said armature also each being of arcuate shape and each of said latter arcuate shapes forming a section of a circle the center of which is displaced from the center of said stud whereby the lengths of each of the air gaps between the ends of said armature and the faces of said poles are uniform throughout the cross sectional areas thereof and these air gap lengths are uniformly reduced as said armature is drawn into alignment with said outer members so that the arcuate ends of said armature and the arcuate surfaces of said magnetic poles are concentric, means attached to said armature cooperating with the recesses in said outer core members for limiting the rotation of said armature, a cover for hermetically sealing said housing, and a shaft attached to said armature extending out of said housing through a hole formed in said cover, said cover being of deformable and flexible material so that a portion of said cover is adapted to rotate with said shaft.

4. An electrically energized device as set forth in claim 3, further characterized in that there is provided a ball bearing assembly having an inner race supported by said stud and an outer race, said armature having a recess for receiving said outer race and means for clamping said outer race in said armature recess.

5. An electrically energized device as set forth in claim 3, further characterized in that there is provided means for attaching said shaft to said armature comprising an elongated member attached to said armature, a ball bearing assembly, said elongated member having a recess formed therein for receiving the outer race of said ball bearing assembly so that said outer race is clamped between said elongated member and said armature.

6. An electrically energized device as set forth in claim 3, further characterized in that said shaft is provided with an output lever and means for keying said lever to said shaft comprising a disc and pin means extending between said lever and said disc, said disc having means for receiving said cover so that said lever is on the outside of said cover.

7. An electrically energized device as set forth in claim 6, further characterized in that said housing cover includes an extension surrounding said shaft and extending substantially to said disc, and a bearing for said shaft positioned in the end portion of said extension adjacent to said disc.

References Cited in the file of this patent

UNITED STATES PATENTS

| | | |
|---|---|---|
| 1,920,135 | Allen | July 25, 1933 |
| 2,216,620 | List | Oct. 1, 1940 |
| 2,364,656 | Price | Dec. 12, 1944 |
| 2,563,271 | Price | Aug. 7, 1951 |

FOREIGN PATENTS

| | | |
|---|---|---|
| 824,969 | Germany | Dec. 17, 1951 |